United States Patent
Umeda

(10) Patent No.: US 8,025,497 B2
(45) Date of Patent: Sep. 27, 2011

(54) METHOD FOR MANUFACTURING SHORT FIBER ORIENTED RUBBER OR SYNTHETIC RESINE AND EXPANSION DIE FOR EXTRUSION MOLDING

(75) Inventor: Arao Umeda, Hyogo (JP)

(73) Assignee: Bando Kagaku Kabushiki Kaisha, Hyogo (JP)

( * ) Notice: Subject to any disclaimer, the term of this patent is extended or adjusted under 35 U.S.C. 154(b) by 760 days.

(21) Appl. No.: 12/010,182

(22) Filed: Jan. 22, 2008

(65) Prior Publication Data
US 2008/0174047 A1    Jul. 24, 2008

(30) Foreign Application Priority Data
Jan. 22, 2007    (JP) .................................. 2007-011037

(51) Int. Cl.
*B29C 47/20*    (2006.01)

(52) U.S. Cl. ... 425/192 R; 264/39; 264/108; 264/209.8; 425/380; 425/382.4; 425/467

(58) Field of Classification Search .............. 425/192 R, 425/380, 382.4, 467; 264/39, 108, 209.8
See application file for complete search history.

(56) References Cited

U.S. PATENT DOCUMENTS

| | | | | |
|---|---|---|---|---|
| 3,327,038 A | * | 6/1967 | Fox ............................ | 264/209.8 |
| 3,331,103 A | * | 7/1967 | Fox ............................ | 425/72.1 |
| 3,475,789 A | * | 11/1969 | Stroup et al. .................. | 425/462 |
| 4,021,170 A | * | 5/1977 | Andersen et al. ............. | 425/72.1 |
| 4,056,591 A | * | 11/1977 | Goettler et al. ............... | 264/108 |
| 5,307,843 A | * | 5/1994 | Jarrin et al. .................... | 138/174 |

FOREIGN PATENT DOCUMENTS
JP    6-9847    2/1994

* cited by examiner

*Primary Examiner* — Yogendra Gupta
*Assistant Examiner* — Joseph Leyson
(74) *Attorney, Agent, or Firm* — Wenderoth, Lind & Ponack, L.L.P.

(57) ABSTRACT

A method includes steps of extruding rubber or synthetic resin mixed with short fibers from a sectionally annular mold opening, and molding a cylindrical body of rubber or synthetic resin with short fibers oriented in a predetermined direction. The mold opening has an expansion portion 9 whose diameter expands in an extrusion direction, and a flow passage width Wi of an inlet portion 6i of the mold opening, a flow passage width Wo of an outlet portion 6o, and radiuses Ri and Ro of the inlet portion 6i and the outlet portion 6o respectively that are coaxial with the mold opening satisfy a relation of Wo/Wi<Ro/Ri. The value of Ro/Ri is adjusted within a scope of $2 \leqq Ro/Ri \leqq 8$ by changing the radius Ri of the inlet portion according to mechanical properties in the circumferential direction of the cylindrical body to be molded, so that orientation of the short fibers is adjusted.

10 Claims, 4 Drawing Sheets

(a)

(b)

METHOD FOR MANUFACTURING SHORT FIBER ORIENTED RUBBER OR SYNTHETIC RESINE AND EXPANSION DIE FOR EXTRUSION MOLDING

FIELD OF THE INVENTION

The present invention relates to a method for manufacturing short fiber oriented rubber or synthetic resin wherein rubber or synthetic resin mixed with short fiber is extruded from a sectionally annular mold opening, and to a cylindrical body with short fiber oriented in a predetermined direction, to and an expansion die for extrusion molding that has the sectionally annular mold opening.

BACKGROUND OF THE INVENTION

With respect to the art of orienting short fiber mixed in rubber or synthetic resin, known is a method for extruding rubber or synthetic resin mixed with short fiber, from an expansion die for extrusion molding having a sectionally annular mold opening. As for the expansion die for extrusion molding, for example the next one is included. The mold opening comprises an inlet opening, a middle opening (expanded portion), and an outlet opening. A sectional area of the outlet opening is formed larger than that of the inlet opening, a flow passage width of the inlet portion is smaller than that of the outlet portion, the flow passage width of the outlet portion is less than that of the middle opening, and the middle opening is provided with an expansion opening portion having an expanded flow passage width (e.g. Japanese Patent Publication No. H6-9847 (Pages 2 to 4, FIGS. 1 to 5).

When rubber or synthetic resin mixed with short fiber is extruded from this expansion die for extrusion molding, the orientation rate of the short fiber in the circumferential direction and the radius direction in the middle opening increases so that a cylindrical body is formed in which short fibers are oriented at a predetermined rate in the extrusion direction and in the circumferential direction and the radius direction, respectively.

The thus formed cylindrical body is cut open in the longitudinal direction to be formed into a sheet, and subsequently cut in the predetermined length, and it is used for bottom rubber of a transmission belt, buffer material, seal material, shoe sole, floor material, caterpillar cover material, etc. Since the sheet material mixed with short fibers has high strength and modulus in the orientation direction, formed sheet material (i.e. cylindrical body) has a different balance in orientation rate in each direction according to application. For example, in the case of the sheet material used for bottom rubber of the V belt, where lateral pressure resistance against load laterally received is required to prevent deformation, the cylindrical body having a high orientation rate in the circumferential direction is formed and this is cut open in the longitudinal direction to the predetermined length and cut in the width direction at predetermined intervals. Thus the sheet material with short fibers oriented in the width direction can be obtained by cutting open the cylindrical body. Therefore the sheet material can be more efficiently molded compared with the conventional calendar molding method where the cut sheet materials are connected at width direction end portions.

Meanwhile, when the rubber or synthetic resin mixed with short fibers is extruded from the above described expansion die having the mold opening, the short fibers are apt to be oriented in the circumferential direction. However, it is more apt to be oriented in the extrusion direction and in the radius direction depending on the shapes of the mold opening, and the orientation rate in the circumferential direction is lowered. Therefore, it is difficult in some cases to form the cylindrical body that satisfies the mechanical property in the circumferential direction.

SUMMARY OF THE INVENTION

It is an object of the present invention to provide a method for manufacturing short fiber oriented rubber or synthetic resin and an extrusion molding die head, wherein a cylindrical body having excellent mechanical properties in a circumferential direction can be easily molded by circumferentially orienting short fibers efficiently.

According to a first aspect of a method for manufacturing short fiber oriented rubber or synthetic resin, the method comprises steps of extruding rubber or synthetic resin mixed with short fibers from a mold opening that is sectionally annular, molding a cylindrical body of the rubber or synthetic resin with the short fiber oriented in a predetermined direction, and passing through the mold opening an expansion portion with a diameter expanding in the extrusion direction. A flow passage width $W_i$ of an inlet portion of the mold opening, a flow passage width $W_o$ of an outlet portion, and radiuses $R_i$ and $R_o$ of the inlet portion and the outlet portion, respectively, that are coaxial with the mold opening satisfy a relation of $W_o/W_i < R_o/R_i$. Orientation of the short fiber is adjusted by adjusting a value of $R_o/R_i$ within a scope of $2 \leq R_o/R_i \leq 8$ according to mechanical properties in the circumferential direction of the cylindrical body to be molded.

According to this method for manufacturing the short fiber oriented rubber or synthetic resin, the short fibers are apt to orient in the circumferential direction (Y direction) of the cylindrical body because the relation of $W_o/W_i < R_o/R_i$ is satisfied. And the short fibers can be efficiently oriented in Y direction by adjusting the value of $R_o/R_i$ within a scope of $2 \leq R_o/R_i \leq 8$.

That means, Z direction orientation rate of the short fibers (thickness direction of the cylindrical body) depends on $W_o/W_i$, and Y direction orientation depends on the expansion ratio $R_o/R_i$. Therefore, if $R_o/R_i$ is larger than $W_o/W_i$, the short fibers are more easily oriented in the Y direction than in the Z direction. And if $R_o/R_i$ is less than 2, the short fibers can not be exclusively oriented in Y direction. If $R_o/R_i$ exceeds 8, increase tendency of the y direction orientation rate is extremely lowered. This is because Y direction orientation rate to the expansion ratio shows a value close to arctangent of circumferential draw rate (or expansion ratio) of the rubber or synthetic resin in the mold opening.

Therefore, when the rubber or synthetic resin including the short fibers is extruded through the mode opening with expansion ratio where $R_o/R_i$ is adjusted within a scope of $2 \leq R_o/R_i \leq 8$, the short fibers are circumferentially oriented efficiently, so that the cylindrical body excellent in mechanical properties in the circumferential direction can be easily molded.

Since the method for manufacturing short fiber oriented rubber or synthetic resin according to the above-described first aspect can easily mold the cylindrical body having excellent mechanical properties in Y direction, productivity of products manufactured using this cylindrical body is increased. Since orientation of the short fibers is adjusted by adjusting the expansion ratio, a various types of products can be easily provided.

According to a second aspect of the rubber or synthetic resin, the aspect ratio of the short fiber is 10 to 300.

According to this method for manufacturing the short fiber oriented rubber or synthetic resin, since the mixed short fiber can be effectively oriented in the flow direction of the rubber or synthetic resin, the short fiber can be circumferentially oriented more efficiently.

That means, the aspect ratio of the short fiber is less than 10, and efficiency is the relation between expansion ratio Ro/Ri and orientation rate. Or the Y direction orientation to the expansion rate Ro/Ri extremely decreases, and the mechanical property in the circumferential direction of the cylindrical body to be molded is short. And when the aspect ration exceeds 300, the short fiber exists in clumps in the rubber or synthetic resin, the cylindrical body of stable quality can not be molded because deformation occurs during vulcanization, and strength distribution is uneven. Basically, when diameters of the short fibers are the same, a longer one is more possibly oriented and a scope of the aspect ratio 30 to 150 is preferable. As for the short fibers, aramid fiber, polyamide fiber, polyester fiber, and cotton can be used, for example.

Since the above described second aspect of the method for molding short fiber oriented rubber or synthetic resin can easily mold the cylindrical body having excellent mechanical properties in the Y direction, and the cylindrical body to be molded includes short fibers having an industrially useful aspect ratio, productivity of the products can be increased while maintaining quality.

A third aspect of the method for molding short fiber oriented rubber or synthetic resin features that a flow passage width of the mold opening is constant.

According to this method for molding short fiber oriented rubber or synthetic resin, the short fiber is difficult to be oriented in the Z direction in the mold opening. Therefore, the Y direction orientation efficiency of the short fiber increases as a result.

In the method for molding short fiber oriented rubber or synthetic resin according to the above described third aspect, the cylindrical body having excellent Y direction mechanical properties can be efficiently molded.

A fourth aspect of an expansion die for extrusion molding comprises a mold opening that is sectionally annular and formed with an inner surface of an outer die and an outer surface of an inner die, and an expansion portion whose diameter expands in an extrusion direction is provided to the mold opening.

A flow passage width Wi of an inlet portion of the mold opening, a flow passage width Wo of an outlet portion, and radiuses Ri and Ro of the inlet portion and the outlet portion respectively that are coaxial with the mold opening have a relation of Wo/Wi<Ro/Ri. An expansion ratio Ro/Ri is adjusted within a scope of $2 \leqq Ro/Ri \leqq 8$ by changing the radius Ri of the inlet portion according to the mechanical property in the circumferential direction of the cylindrical body to be molded, so that orientation of the short fiber is adjustable.

According to this expansion die for extrusion molding, the Z direction orientation rate of the short fiber depends on Wo/Wi, and Y direction orientation depends on Ro/Ri. Therefore, if Ro/Ri is larger than Wo/Wi, the short fiber is more easily oriented in the Y direction. The value of Ro/Ri is adjusted within a scope of $2 \leqq Ro/Ri \leqq 8$ by changing the radius Ri of the inlet portion, thereby making it possible to efficiently orient the short fiber in the Y direction.

That means, if Ro/Ri is less than 2, the short fiber can not be exclusively oriented in the Y direction. If Ro/Ri exceeds 8, an increase tendency of the y direction orientation rate is extremely reduced. This is because Y direction orientation rate to the expansion ratio shows a value close to arctangent of circumferential draw rate (multiple factor or expansion ratio) of the rubber or synthetic resin in the mold opening.

And when Ro/Ri is too large, there are problems as follows. When the expansion ratio Ro/Ri is enlarged by expanding the radius Ro of the outlet portion, a head pressure for extruding the rubber or synthetic resin should be high. Then the inner die receiving the head pressure is required to be structured highly strongly, and therefore the design becomes difficult. And a radius of the molded cylindrical body is too large, and when the cylindrical body is cut open in the longitudinal direction into a sheet, a sheet width is extremely broad, which decreases operability. In addition, if the head pressure is raised as mentioned above in the case of extruding the rubber or synthetic resin with a screw, the revolution rate should be raised, which decreases viscosity of the rubber or synthetic resin due to frictional heat with the screw, thereby decreasing orientation of the short fiber.

On the other hand, when Ro/Ri is increased by decreasing the radius of the inlet without changing Ro (that means, the radius of the cylindrical body is constant and the width is constant in the case of sheet state of the cylindrical body), the flow passage width in front of the inlet portion is extremely narrow. And in the case of a structure in which the expansion die for extrusion molding makes the spider shaft support the inner die, the radius of the spider shaft should be narrowed, which could therefore lead to a condition where strength against head pressure can not be secured.

Therefore, the expansion ratio Ro/Ri is adjustable within a scope of $2 \leqq Ro/Ri \leqq 8$ and the short fiber is circumferentially oriented efficiently, so that the cylindrical body excellent in mechanical property in the circumferential direction can be easily molded.

The above described fourth aspect extrusion die can stably supply the cylindrical body having excellent mechanical properties in the Y direction, and can also easily cope with various types of products because the orientation of the short fibers can be adjusted by adjusting the expansion ratio.

According to a fifth aspect of the expansion die for extrusion molding, a flow passage width of the mold opening keeps constant.

This expansion die for extrusion molding can make it difficult in that the short fiber is oriented in the Z direction in the mold opening, and therefore Y direction orientation of the short fiber can be efficiently changed.

According to a fifth aspect of the expansion die for extrusion molding, the cylindrical body having excellent mechanical property in the Y direction can be stably supplied.

According to a sixth aspect of the expansion die for extrusion molding, a center block has at least one of the outer die and the inner die in such manner that the center block is partially dividable. The center block is provided with surfaces that partially form the inner surface of the outer die, the outer surface of the inner die, and the mold opening. The radius Ri of the inlet portion is changeable by attaching, removing, or exchanging the center block.

According to this expansion die for extrusion molding, since the expansion ratio Ro/Ri is adjustable by attaching and removing, or exchanging the center block, various types of expansion dies can be molded by a single unit of expansion die.

Since the expansion die for extrusion molding according to the sixth aspect can change the expansion ratio by attaching/removing or exchanging the center block, a single unit can supply various types of a cylindrical body of rubber or synthetic resin.

According to a seventh aspect of the expansion die for extrusion molding, a flow passage width W7' immediately in front of the inlet portion after the center block is removed is not less than 5 times of the flow passage width Wi of the inlet portion.

According to this expansion die for extrusion molding, the rubber or synthetic resin mixed with short fiber is oriented at random in respective directions X, Y, Z without disproportioning orientation rate of the short fiber in one direction immediately in front of the inlet portion so that a disadvantageous factor for short fibers orientation in the mold opening is eliminated and the short fibers can be circumferentially oriented efficiently.

The expansion die for extrusion molding of the above described seventh aspect can stably supply the cylindrical body having excellent Y direction mechanical properties.

DESCRIPTION OF THE PREFERRED EMBODIMENTS

Preferred embodiments of the method for manufacturing short fiber oriented rubber or synthetic resin and the expansion die for extrusion molding related to the present invention will be described.

Figure 1:
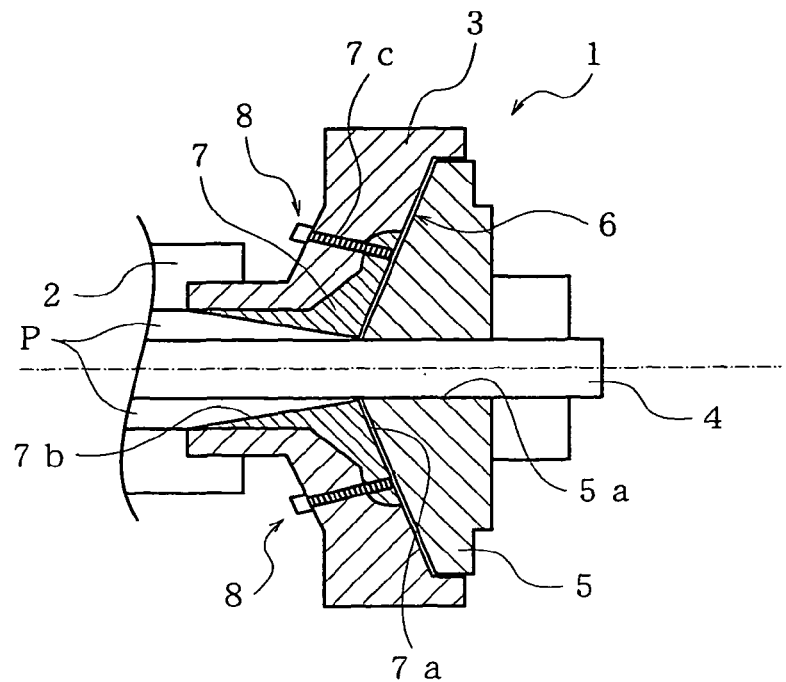
FIG. 1 is a vertical-cross sectional diagram showing an embodiment of an expansion die for extrusion molding related to the present invention.
Figure 2:
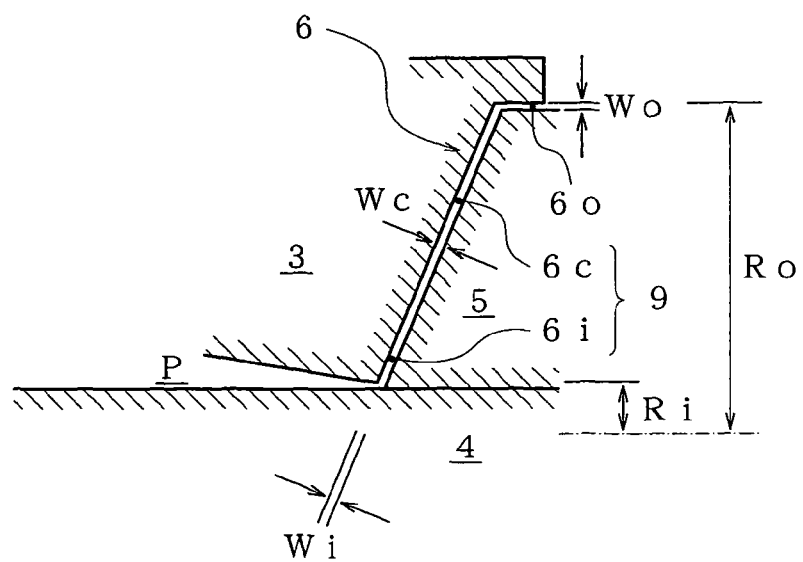
FIG. 2 is a partially expanded diagram of a mold opening in FIG. 1.

FIG. 1 is a schematic diagram of an expansion die 1 for extrusion molding and a vertical-cross sectional view cut along the extrusion direction. FIG. 2 shows a partially expanded diagram of a mold opening 6 described later. The expansion die 1 for extrusion molding (also referred to as expansion die 1 hereinafter) is arranged in an extrusion outlet 2 of an extruder, and includes an outer die 3 having an annular cross section and an inner die 5 having a disk shape as principal components. The outer die 3 is fixed to an end of the extrusion outlet 2, a spider shaft 4 is coaxially supported by the extrusion outlet 2 in such a manner that the shaft passes through the extrusion outlet, and the inner die 5 is fixed on the spider shaft 4 in such a manner that the shaft passes through a through hole 5a provided at a center portion of the inner die 5.

In this expansion die 1, a mold opening 6 that is sectionally annular and molds molding material (rubber or synthetic resin including short fibers) into a cylindrical body is formed between an inner circumferential surface of the outer die 3 and an outer circumferential surface of the inner die 5. The molding material is sent to the mold opening 6 through a flow passage P that is a space provided between the spider shaft 4 and the inner circumferential surfaces of the extrusion outlet 2 and the outer die 3.

In the expansion die 1, a first center block 7 that is sectionally annular is provided in such a manner that the inner circumferential portion of the outer die 3 is partially dividable with the first center block 7. A front side in the extrusion direction of an inner circumferential surface of the center block 7 forms part of the inner circumferential surface of the outer die 3 and a mold surface 7a for constituting the mold opening 6. A back side in the extrusion direction is formed with a taper passage surface 7b for narrowing down the flow passage P in the extrusion direction. By this taper passage surface 7b, pressure of the molding material in the flow passage increases. The center block 7 is fixed in such manner that a screw hole 7c bored in the outer circumferential portion of the center block 7 in the extrusion direction is screwed together with an end of a bolt 8 penetrating the outer die 3.

Figure 3:
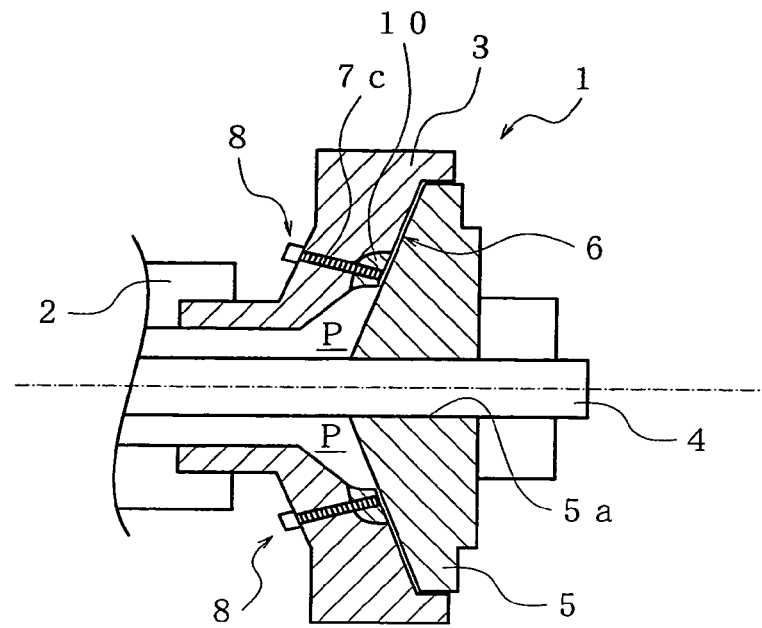
FIG. 3 is a vertical-cross sectional diagram of the expansion die for extrusion molding in a state such that a center block is exchanged in FIG. 1.
Figure 4:
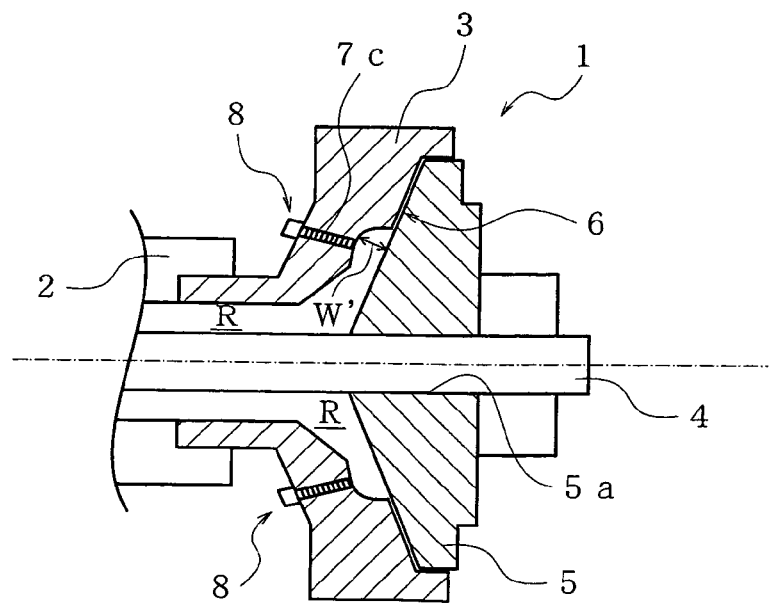
FIG. 4 is a vertical-cross sectional diagram of the expansion die for extruding molding in a state such that the center block is removed.

A flow passage width of the above described mold opening 6 is constantly 3 mm, and relation of Wi=Wc=Wo is established among a flow passage width Wi of an inlet portion 6i, flow passage width Wc of a middle portion 6c, and flow passage width Wo of an outlet portion 6o. In the mold opening 6, an area of the outlet portion 6o is larger than that of the inlet portion 6i, and an expansion portion 9 is formed by the inlet portion 6i and the middle portion 6c. An expansion ratio of this expansion portion 9 is expressed by Ro/Ri, in which a radius of the inlet portion 6i with a shaft center of the spider shaft 4 as a center is Ri, and a radius of the outlet portion is Ro. The expansion ratio is changeable by attaching and removing the center block 7, or exchanging the center block for one with a different diameter. This is because the radius direction location of the inlet portion 6i changes by attaching and removing or exchanging the center block 7, and then the radius Ri changes. With respect to this expansion die 1, the case in which the center block 7 is attached is expressed by Ro/Ria=7.5 (FIG. 1), the case in which a ring-shaped center block 10 is substituted is expressed by Ro/Ri=4.4 (FIG. 3), and the case in which the first center block 7 and the ring-shaped center second block 10 are removed is expressed by Ro/Ri=2 (FIG. 4). Therefore, it is clear that the inner radius of the first center block 7 is smaller than the inner radius of the second center block 10. Moreover, the first center block 7 and the second center block 10 are interchangeably and removably mounted between the outer die 3 and the inner die 5 to adjust the radius Ri of the inlet portion 6i of the mold opening 6. Thus, an orientation rate in the Y direction is adjustable by changing the expansion ratio with the appropriate center block 7, 10, so that various types of cylindrical bodies can be molded by a single unit of expansion die 1.

And when the center block 10 is removed, the flow passage width W' in front of the inlet portion 6i is more than five times as large as the flow passage width Wi of the inlet portion 6i. Therefore the rubber or synthetic resin mixed with short fibers is oriented at random in respective directions X, Y, Z without disproportioning the orientation rate of the short fibers in one direction in front of the inlet portion 6i so that disadvantageous factor for short fiber orientation in the mold opening 6 is eliminated.

Although the center block 7 is mounted to the outer die 3 in the above-described expansion die 1, it may be mounted to the inner die 5 and may be provided to both of the outer die 3 and the inner die 5.

The orientation rate of the cylindrical body of rubber including short fibers that is molded using this expansion die 1 is examined. The orientation rate is obtained in such a way that specimens of 37 mm diameter are stamped out after the cylindrical body is vulcanized, the specimens are immersed in toluene for 50 hours at the room temperature, swelling degree of the cylindrical body is measured in longitudinal direction (X direction), circumferential direction (Y direction), and radius direction (Z direction), and a percentage value of the inverse number thereof is the orientation rate. This is because mechanical performance of tensile strength increases and deformation due to swelling is restrained, when short fibers are much oriented.

[Test 1]

Rubber mixed with short fibers having an aspect ratio 110 is extruded from the expansion die 1 including the center block 7 (Ro/Ri=7.5) to mold the cylindrical body including short fibers. The test is conducted under the condition that mandrel diameter of the extruder is ø 90 mm, revolution rate of the extrusion screw is 10 min$^{-1}$, and temperature of the die is 100° C. As for rubber composition, EP rubber is 100 weight, carbon black is 70 weight, oil is 20 weight, short fiber is 20 weight, and others are 12 weight. And when orientation rate of the vulcanized rubber including short fibers is examined, Y direction is 89.6%, X direction is 6.2%, Z direction is 4.2%.

Next, when the cylindrical body of rubber including short fibers is molded with the ring-shaped center block 10 while the center block 10 is attached (Ro/Ri=4.4), and the orientation rate of vulcanized rubber including short fibers is examined, Y direction is 73.1%, X direction is 15.3%, and Z direction is 11.6%.

And when the cylindrical body of rubber including short fibers is molded while the center block 7 and the ring-shaped center block 10 are removed (Ro/Ri=2) and orientation rate of vulcanized rubber including short fibers is similarly examined, Y direction is 44.5%, X direction is 32.7%, and Z direction is 22.8%. The results of this test are shown in Table 1.

including short fibers is similarly examined, Y direction is 67.7%, X direction is 19.4%, and Z direction is 12.9%.

And when the cylindrical body of rubber including short fibers is molded with the center block 7 and the ring-shaped center block 10 are removed (Ro/Ri=2), and the orientation rate of vulcanized rubber including short fibers is similarly examined, Y direction is 38.2%, X direction is 31.9%, and Z direction is 29.9%. The results of this test are shown in Table 2.

TABLE 2

| Die flow passage width | | | Expansion ratio | Variable | | | Orientation rate | | | Fiber aspect ratio |
|---|---|---|---|---|---|---|---|---|---|---|
| Wi | Wc | Wo | Ro/Ri | Wo/Wi | Wo/Wi | Wo/Wc | Y | X | Z | |
| 3 | 3 | 3 | 7.5 | 1 | 1 | 1 | 78.2 | 13.6 | 8.2 | 35 |
| 3 | 3 | 3 | 4.4 | 1 | 1 | 1 | 67.7 | 19.4 | 12.9 | 35 |
| 3 | 3 | 3 | 2 | 1 | 1 | 1 | 38.2 | 31.9 | 29.9 | 35 |

Results of Test 1 and Test 2 show that Y direction orientation rate described in Tables 1 and 2 can be realized by one pass from a random state such that short fibers are uniformly oriented to directions of X Y Z respectively (approximately 33.3% of orientation rate to respective directions), and the cylindrical body to satisfy mechanical properties in the Y direction remarkably efficiently compared with the conventional calendar molding can be molded.

Figure 5:
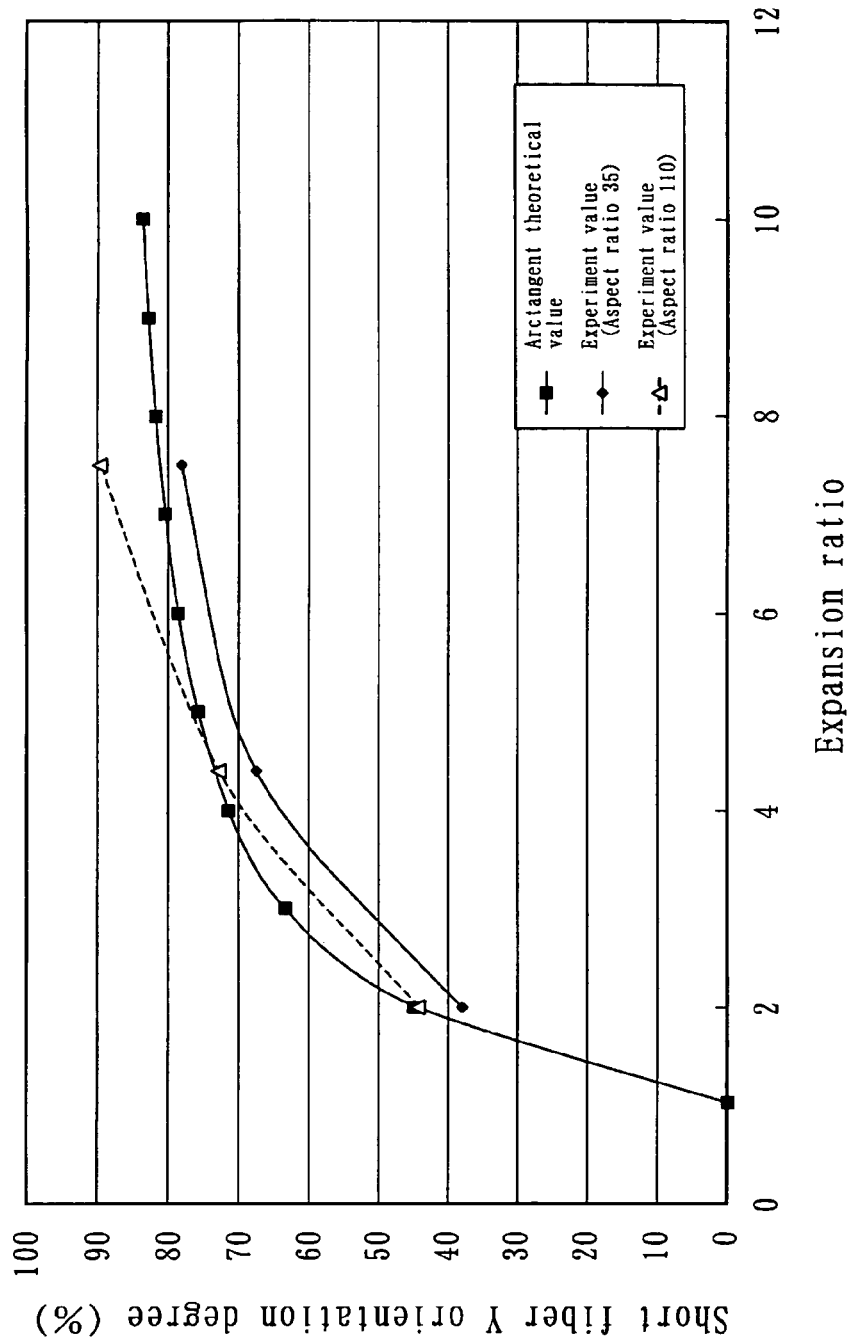
FIG. 5 is a graph showing orientation rate and arc tangent value in Y direction in Tests 1 and 2.

And compared with the Y direction orientation rate and value of arctangent of expansion ratio in FIG. 5, either test result of short fiber aspect ratio of 35 and 110 show a close value to arctangent of expansion ratio. Therefore, it is realized that expansion ratio Ro/Ri may be set within a scope of 2≦Ro/Ri≦8 as a guide for efficiently orienting short fibers in the Y direction.

[Test 3]

Rubber mixed with respective short fibers of aspect ratio 2 to 5, 370, 500 is extruded from the expansion die 1 with the center block 7 (Ro/Ri=7.5) to mold the cylindrical body

TABLE 1

| Die flow passage width | | | Expansion ratio | Variable | | | Orientation rate | | | Fiber aspect ratio |
|---|---|---|---|---|---|---|---|---|---|---|
| Wi | Wc | Wo | Ro/Ri | Wo/Wi | Wo/Wi | Wo/Wc | Y | X | Z | |
| 3 | 3 | 3 | 7.5 | 1 | 1 | 1 | 89.6 | 6.2 | 4.2 | 110 |
| 3 | 3 | 3 | 4.4 | 1 | 1 | 1 | 73.1 | 15.3 | 11.6 | 110 |
| 3 | 3 | 3 | 2 | 1 | 1 | 1 | 44.5 | 32.7 | 22.8 | 110 |

[Test 2]

Rubber mixed with short fibers of aspect ratio 35 is extruded from the expansion die 1 with the center block 7 (Ro/Ri=7.5) to mold the cylindrical body including short fibers. The condition is the same with that of Test 1. And the orientation rate of the short fibers including vulcanized rubber that is obtained by vulcanizing the molded cylindrical body is examined, Y direction is 78.2%, X direction is 13.6%, Z direction is 8.2%.

Next, when the cylindrical body of rubber including short fibers is molded with the ring-shaped center block 10 attached (Ro/Ri=4.4) and the orientation rate of vulcanized rubber including short fibers. The cylindrical body including short fibers of aspect ratio 370 and 500 is molded. Then in the cylindrical body including short fibers of aspect ratio of 370 and 500, short fibers are in the state of lump and it is not proper as a rubber material. That means, if short fibers exists in the state of lump in the rubber material, deformation occurs during vulcanization and strength distribution becomes uneven. And examined orientation rate of the vulcanized rubber including short fibers that is obtained by vulcanizing the cylindrical body including short fiber having aspect ratio 2 to 5, Y direction is 36.2%, X direction is 37.1%, and Z direction is 26.7%, and the orientation rate is higher in the X direction than in the Y direction. The results of this test 3 are shown in Table 3.

TABLE 3

| Die flow passage width | | | Expansion ratio | Variable | | | Orientation rate | | | Fiber aspect ratio |
|---|---|---|---|---|---|---|---|---|---|---|
| Wi | Wc | Wo | Ro/Ri | Wo/Wi | Wo/Wi | Wo/Wc | Y | X | Z | |
| 3 | 3 | 3 | 7.5 | 1 | 1 | 1 | — | — | — | 500 |
| 3 | 3 | 3 | 7.5 | 1 | 1 | 1 | — | — | — | 370 |
| 3 | 3 | 3 | 7.5 | 1 | 1 | 1 | 36.2 | 37.1 | 26.7 | 2 to 5 |

Based on the results of the test, if the short fiber aspect ratio is out of the scope of 10 to 300, it is found difficult to mold the cylindrical body to satisfy a Y direction mechanical property in the Y direction.

Figure 6:
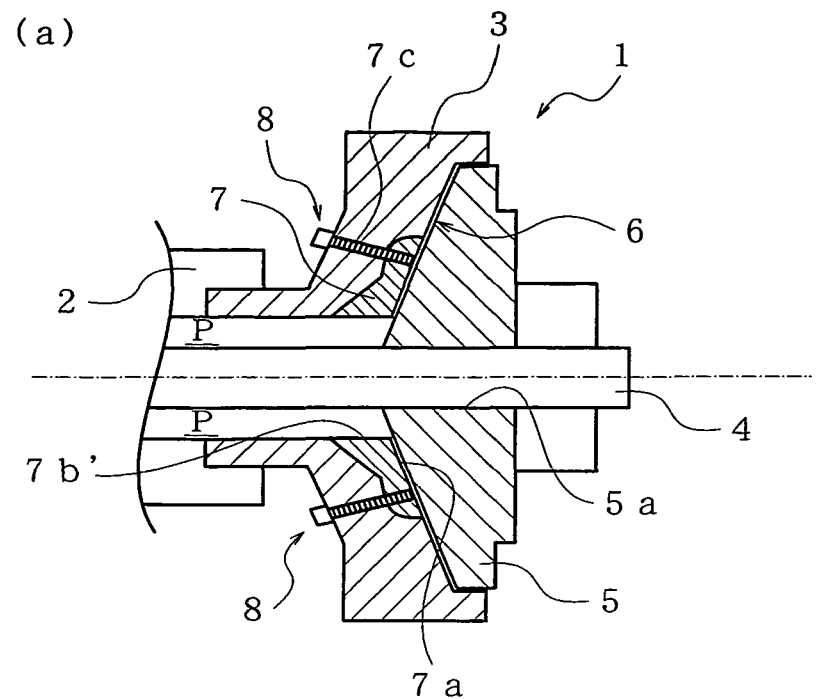
FIGS. 6(a) and 6(b) are vertical cross sectional diagrams showing another embodiment of a center block of an expansion die for extrusion molding related to the present invention.
Figure 6:
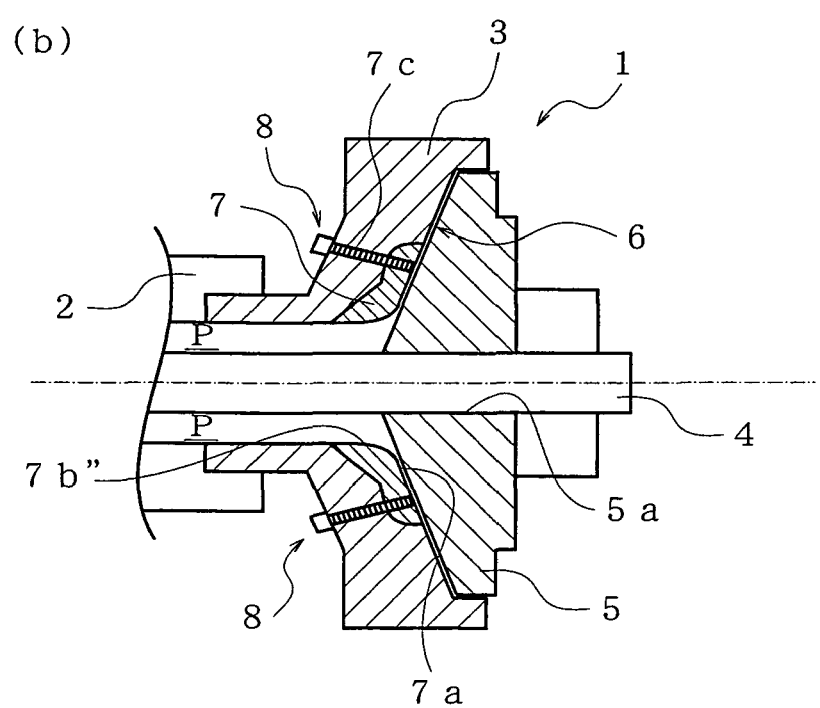

In the above-described embodiment, the taper surface $7b$ is formed for restricting the flow passage P in the front side of the extrusion direction of the inner surface of the center block. If possible to fully apply pressure to the molding material, a straight surface $7b'$ can be formed as shown in FIG. 6 (a), and a bell-shaped surface with a diameter gradually expanding in extrusion direction like the surface $7''$ in FIG. 6 (b).

What is claimed is:

1. An expansion die for extrusion molding, comprising:
an outer die having an inner surface;
an inner die having an outer surface, said inner die being arranged with respect to said outer die such that an annular mold opening is formed between said inner surface of said outer die and said outer surface of said inner die, said mold opening having an expansion portion with a diameter expanding in an extrusion direction, said mold opening having an inlet portion with a radius Ri and a width Wi, and said mold opening having an outlet portion with a radius Ro and a width Wo, each of said inlet portion, said radius Ri, said outlet portion, and said radius Ro being coaxial with said mold opening;
a first annular center block; and
a second annular center block, an inner diameter of said first center block being smaller than an inner diameter of said second center block, said first center block and said second center block being interchangeably and removably mountable between said outer die and said inner die for adjusting a radius Ri of said inlet portion of said mold opening;
wherein said outer die, said inner die, said first annular center block, and said second annular center block are configured to allow adjustment of a shape of said mold opening by interchanging said first center block and said second center block, and by removing both said first center block and said second center block, such that the shape of said mold opening meets a ratio Wo/Wi<Ro/Ri, and such that an expansion ratio Ro/Ri of said mold opening is within a range of $2 \leq Ro/Ri \leq 8$.

2. The expansion die of claim 1, wherein said mold opening has a uniform flow passage width.

3. The expansion die of claim 2, wherein said first center block and said second center block are interchangeably and removably mounted to said outer die by a bolt.

4. The expansion die of claim 1, wherein a flow passage width W' in front of said inlet portion of said mold opening when neither of said first center block and said second center block is mounted between said outer die and said inner die is at least 5 times a size of said width Wi of said inlet portion.

5. The expansion die of claim 4, wherein said first center block and said second center block are interchangeably and removably mounted to said outer die by a bolt.

6. The expansion die of claim 1, wherein said first center block and said second center block are interchangeably and removably mounted to said outer die by a bolt.

7. A method of manufacturing short fiber oriented rubber or synthetic resin by extrusion molding, said method comprising:
providing an expansion die including:
an outer die having an inner surface;
an inner die having an outer surface, the inner die being arranged with respect to the outer die such that an annular mold opening is formed between the inner surface of the outer die and the outer surface of the inner die, the mold opening having an expansion portion with a diameter expanding in an extrusion direction, the mold opening having an inlet portion with a radius Ri and a width Wi, and the mold opening having an outlet portion with a radius Ro and a width Wo, each of the inlet portion, the radius Ri, the outlet portion, and the radius Ro being coaxial with the mold opening;
a first annular center block; and
a second annular center block, an inner diameter of the first center block being smaller than an inner diameter of the second center block, the first center block and the second center block being interchangeably and removably mountable between the outer die and the inner die for adjusting a radius Ri of the inlet portion of the mold opening;
wherein the outer die, the inner die, the first annular center block, and the second annular center block are configured to allow adjustment of a shape of the mold opening by interchanging the first center block and the second center block, and by removing both the first center block and the second center block, such that the shape of the mold opening meets a ratio Wo/Wi<Ro/Ri, and such that an expansion ratio Ro/Ri of the mold opening is within a range of $2 \leq Ro/Ri \leq 8$;
extruding rubber or synthetic resin mixed with short fibers from the mold opening of the expansion die;
molding a cylindrical body of the rubber or synthetic resin such that the short fibers are oriented in a predetermined direction; and
inserting, interchanging and removing the first center block and the second center block between the outer die and the inner die as necessary to adjust the radius Ri of the inlet portion of the mold opening during said extruding so as to thereby obtain a correct orientation of the short fibers in the predetermined direction within the cylindrical body.

8. The method of claim 7, wherein said inserting, interchanging and removing of the first center block and the second center block are performed so that an aspect ratio of the short fibers is 10 to 300.

9. The method of claim 8, wherein the mold opening has a uniform flow passage width.

10. The method of claim 7, wherein the mold opening has a uniform flow passage width.

* * * * *